United States Patent
Morita

(10) Patent No.: US 9,616,665 B2
(45) Date of Patent: Apr. 11, 2017

(54) METHOD FOR MANUFACTURING LIQUID SUPPLY MEMBER AND METHOD FOR MANUFACTURING LIQUID DISCHARGE HEAD

(75) Inventor: Osamu Morita, Yokosuka (JP)

(73) Assignee: CANON KABUSHIKI KAISHA, Tokyo (JP)

(*) Notice: Subject to any disclaimer, the term of this patent is extended or adjusted under 35 U.S.C. 154(b) by 302 days.

(21) Appl. No.: 13/509,246

(22) PCT Filed: Nov. 5, 2010

(86) PCT No.: PCT/JP2010/006516
§ 371 (c)(1),
(2), (4) Date: May 10, 2012

(87) PCT Pub. No.: WO2011/061900
PCT Pub. Date: May 26, 2011

(65) Prior Publication Data
US 2012/0222309 A1    Sep. 6, 2012

(30) Foreign Application Priority Data
Nov. 18, 2009 (JP) ................. 2009-263076

(51) Int. Cl.
*B41J 2/16* (2006.01)
*B41J 2/175* (2006.01)
(Continued)

(52) U.S. Cl.
CPC ......... *B41J 2/1603* (2013.01); *B29C 65/1635* (2013.01); *B29C 65/1664* (2013.01);
(Continued)

(58) Field of Classification Search
CPC ................ Y10T 29/49401; B41J 2/1634
(Continued)

(56) References Cited

U.S. PATENT DOCUMENTS 5,808,641 A * 9/1998 Miyagawa .......... B29C 65/1635
347/64
5,893,959 A * 4/1999 Muellich ............. B29C 65/1654
156/272.8
(Continued)

FOREIGN PATENT DOCUMENTS

JP    2005-96422 A    4/2005
WO   2007/007766 A1    1/2007

*Primary Examiner* — A. Dexter Tugbang
*Assistant Examiner* — Kaying Kue
(74) *Attorney, Agent, or Firm* — Canon USA, Inc. IP Division

(57) ABSTRACT

A method for manufacturing a liquid supply member that supplies a discharge port with liquid includes preparing a transparent member and an absorption member, at least one of both members having a groove for a supply path; bringing both members into contact; and forming the supply path by emitting laser beams simultaneously from a plurality of laser beam sources, toward a contact portion, which is provided in a vicinity of the groove and at which both members are in contact, to weld both members. Laser beams are emitted during the forming such that a total laser-beam irradiation amount per unit area for a first portion included in the contact portion and located in a vicinity of an end in a longitudinal direction of the groove is larger than that for part with a smallest irradiation amount of a second portion other than the first portion of the contact portion.

10 Claims, 19 Drawing Sheets

(51) Int. Cl.
  *B29C 65/00*   (2006.01)
  *B29L 31/00*   (2006.01)
  *B29C 65/16*   (2006.01)

(52) U.S. Cl.
  CPC ...... *B29C 65/1667* (2013.01); *B29C 65/1687* (2013.01); *B29C 66/112* (2013.01); *B29C 66/114* (2013.01); *B29C 66/345* (2013.01); *B29C 66/54* (2013.01); *B29C 66/7394* (2013.01); *B41J 2/1623* (2013.01); *B41J 2/1634* (2013.01); *B41J 2/1752* (2013.01); *B41J 2/1753* (2013.01); *B41J 2/17553* (2013.01); *B29C 65/1616* (2013.01); *B29C 65/1677* (2013.01); *B29C 66/7392* (2013.01); *B29C 66/8322* (2013.01); *B29K 2995/0027* (2013.01); *B29L 2031/767* (2013.01); *Y10T 29/49401* (2015.01)

(58) Field of Classification Search
  USPC ...................................... 29/890.1; 347/44, 85
  See application file for complete search history.

(56) References Cited

U.S. PATENT DOCUMENTS

| | | | |
|---|---|---|---|
| 6,693,656 B1* | 2/2004 | Koide | B41J 2/15 347/224 |
| 6,718,088 B2* | 4/2004 | Okazaki | G02B 6/4204 372/6 |
| 6,948,805 B2* | 9/2005 | Hankins | B29C 66/55 347/86 |
| 7,626,138 B2* | 12/2009 | Bovatsek | B23K 26/0617 219/121.68 |
| 7,830,609 B2* | 11/2010 | Inoue | G02B 6/4206 359/641 |
| 7,971,358 B2* | 7/2011 | Morita | B41J 2/175 29/890.1 |
| 8,328,333 B2* | 12/2012 | Oikawa | B41J 2/14072 257/21 |
| 8,567,908 B2* | 10/2013 | Kudo | B29C 65/08 347/44 |
| 8,893,385 B2* | 11/2014 | Tsujiuchi | B29C 65/1635 29/890.1 |
| 2002/0033858 A1* | 3/2002 | Miyazaki | B41J 2/14024 347/20 |
| 2004/0218024 A1* | 11/2004 | Hankins | B29C 66/55 347/86 |
| 2005/0068381 A1* | 3/2005 | Morita | B41J 2/175 347/84 |
| 2005/0121137 A1* | 6/2005 | Kirkland | B29C 66/73921 156/272.8 |
| 2006/0000810 A1* | 1/2006 | Kerr | B23K 26/03 219/85.13 |
| 2006/0274434 A1* | 12/2006 | Mino | G02B 6/4214 359/811 |
| 2007/0051706 A1* | 3/2007 | Bovatsek | B23K 26/0617 219/121.69 |
| 2007/0097191 A1* | 5/2007 | Morita | B41J 2/175 347/85 |
| 2007/0237455 A1* | 10/2007 | Sonoda | G02B 6/4206 385/33 |
| 2008/0173392 A1* | 7/2008 | Tanaka | B23K 26/0604 156/272.8 |
| 2011/0069119 A1* | 3/2011 | Morita | B23K 26/0661 347/44 |
| 2011/0083758 A1* | 4/2011 | Tsujiuchi | B29C 65/1635 137/561 R |
| 2011/0115850 A1* | 5/2011 | Kudo | B29C 65/08 347/44 |
| 2011/0141196 A1* | 6/2011 | Oikawa | B41J 2/14072 347/50 |

\* cited by examiner

METHOD FOR MANUFACTURING LIQUID SUPPLY MEMBER AND METHOD FOR MANUFACTURING LIQUID DISCHARGE HEAD

TECHNICAL FIELD

The present invention relates to a method for manufacturing a liquid supply member that supplies with the liquid a discharge port that discharges liquid, and to a method for manufacturing a liquid discharge head.

BACKGROUND ART

A liquid supply member includes a supply path that supplies with the liquid a discharge port that discharges liquid. For example, the liquid supply member is used for an inkjet recording head which is a representative example of a liquid discharge head including the discharge port.

A configuration of an inkjet recording head will be briefly described with reference to FIG. 14A. An inkjet recording head H1001 includes a tank holder unit H1003 and a recording element unit H1002 that discharges ink. The tank holder unit H1003 includes a tank holder H1500 and a supply path plate H1510.

Ink is supplied to a discharge port from an ink tank (not shown) through an ink supply path that is formed in a liquid supply member (ink supply member) included in the tank holder unit H1003 while being guided by the recording element unit H1002.

FIG. 14B is a bottom view of the tank holder H1500. FIG. 14C is a top view of the supply path plate H1510. The tank holder H1500 and the supply path plate H1510 have grooves H1600 for forming the ink supply path. By joining the tank holder H1500 and the supply path plate H1510 together such that the grooves H1600 face each other, the ink supply path is formed in the ink supply member.

A method for joining the tank holder H1500 and the supply path plate H1510 together may be a known method by laser welding disclosed in Japanese Patent Laid-Open No. 2005-096422.

A method for joining the tank holder H1500 and the supply path plate H1510 together by laser welding will be described. First, the tank holder H1500 being capable of absorbing a laser beam and the supply path plate H1510 being transparent to a laser beam are brought into contact with each other by using a pressing jig 510. Referring to FIGS. 14B and 14C, contact portions 600, at which the tank holder H1500 and the supply path plate H1510 are in contact with each other, are provided in a vicinity of the grooves H1600 to surround the grooves H1600. While the tank holder H1500 and the supply path plate H1510 are in contact with each other, the contact portions 600 are irradiated with laser beams and are joined together. Hence, the ink supply path is formed. Since the ink supply path used for the inkjet recording head has a fine structure, the contact portions 600 have fine structures.

A laser-beam irradiation method includes a scanning method and a simultaneous irradiation method.

The scanning method includes decreasing a spot diameter of a laser beam from a laser beam irradiator, scanning an outline of desirable joint surfaces with the laser beam, and irradiating the joint surfaces with the laser beam. When this method is used, the laser beam with a constant beam diameter scans along the contact portions 600 and welds the contact portions 600 with each other. Thus, the contact portions 600 are irradiated with the uniform laser beam, and the members can be uniformly welded with each other. However, since the laser beam scans along the contact portions 600 and welding the contact portions 600 having the fine structures with each other, this work may take a time.

The simultaneous irradiation method includes irradiating desirable joint surfaces simultaneously with laser beams. This method can decrease a time required for welding.

If it is expected that the tank holder H1500 and the supply path plate H1510 are joined together by the simultaneous irradiation method, to simultaneously irradiate the contact portions 600 provided in a vicinity of the grooves H1600 with laser beams, a plurality of laser beam irradiators are arranged along the grooves H1600.

Meanwhile, referring to FIG. 14B, the ink supply member that supplies the inkjet recording head with the ink includes a region (for example, region A) where the grooves H1600 are densely arranged and a region (for example, region B) where the grooves H1600 are sparsely arranged.

FIG. 15 illustrates laser-beam irradiation when the tank holder H1500 and the supply path plate H1510 are welded with each other by the simultaneous irradiation method. FIG. 15 illustrates a portion in the region B in FIG. 14B containing ends in a longitudinal direction of the grooves H1600.

However, if laser welding is performed by the simultaneous irradiation method, and end contact portions near the ends of the grooves H1600 may be insufficiently welded in the region where the grooves are sparsely arranged (region B in FIG. 14B). For example, the insufficient welding may occur by first and second reasons as follows.

For the simultaneous irradiation, referring to FIG. 15, a plurality of laser beam irradiators 501 to 507 (laser beam sources) with substantially uniform laser-beam intensities are arranged at substantially uniform intervals. Laser beams emitted from the laser beam irradiators propagate and spread by predetermined angles from laser beam apertures. Thus, the number of laser beam irradiators that irradiate the end contact portions with the laser beams is smaller than the number of laser beam irradiators that irradiate portions other than the end contact portions. Thus, in the region B in FIG. 14B, a total irradiation amount per unit area with the laser beams for the end contact portions near the ends in the longitudinal direction of the grooves is smaller than a total irradiation amount per unit area with the laser beams for the contact portions other than the end contact portions. This is the first reason for the insufficient welding at the ends. That is, if the intensity of the laser beams is set to attain an irradiation amount that provides proper welding for the contact portions other than the end contact portions, the irradiation amount with the laser beams for the end contact portions may not achieve the proper irradiation amount required for welding.

Also, the expected second reason is that heat is radiated from the end contact portions in the region B by a larger quantity than a quantity of heat radiated from the contact portions other than the end contact portions.

If the supply path formed by welding contains an insufficiently welded portion, ink may leak from the supply path, and as the result, reliability of the inkjet recording head H1001 may be degraded.

CITATION LIST

Patent Literature

PTL 1: Japanese Patent Laid-Open No. 2005-096422

SUMMARY OF INVENTION

The present invention provides a method for manufacturing a liquid supply member that can reduce likelihood of appearance of a not-welded portion due to insufficient welding when a liquid supply member is formed by laser welding through simultaneous irradiation with laser beams.

According to an aspect of the present invention, a method for manufacturing a liquid supply member that supplies liquid to a discharge port that discharges liquid, the method comprising: preparing a transparent member being transparent to a laser beam and an absorption member being capable of absorbing a laser beam, at least one of the transparent member and the absorption member having a groove for forming a supply path that supplies the discharge port with liquid; bringing the transparent member and the absorption member into contact with each other, with the groove inside; and forming the supply path by emitting laser beams simultaneously from a plurality of laser beam sources arranged along the groove, via the transparent member, toward a contact portion, which is provided in a vicinity of the groove and at which the transparent member and the absorption member are in contact, to weld the transparent member and the absorption member at the contact portion. Laser beams are emitted during the forming such that a total irradiation amount per unit area with laser beams for a first portion that are included in the contact portion and located in a vicinity of an end in a longitudinal direction of the groove is larger than a total irradiation amount per unit area with laser beams for part with a smallest irradiation amount of a second portion other than the first portion of the contact portion.

With the aspect of the present invention, when the liquid supply member is manufactured by irradiating the plurality of members simultaneously with the laser beams and welding the members with each other, the laser beams are emitted such that the total irradiation amount with the laser beams for the end contact portions is larger than the total irradiation amount with the laser beams for the part with the smallest irradiation amount of the contact portions other than the end contact portions. Accordingly, the likelihood of the appearance of the not-welded portion due to insufficient welding can be reduced. The liquid supply member without ink leakage to the outside can be provided.

DESCRIPTION OF EMBODIMENTS

Liquid Discharge Head

An inkjet recording head will be described as an example of a liquid discharge head that is supplied with liquid by a liquid supply member used in this embodiment.

The inkjet recording head includes at least a discharge port that discharges ink, and an ink supply path (supply path) that communicates with the discharge port and supplies the discharge port with the ink.

For example, an inkjet recording head included as a component in a recording head cartridge will be described with reference to FIGS. 12A and 12B.

Figure 12A:
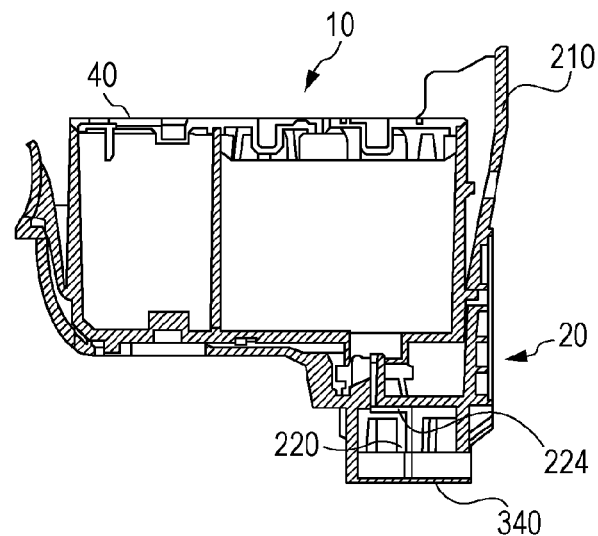
FIG. 12A illustrates a general inkjet recording head to which any of the embodiments of the present invention is applicable.

Referring to FIG. 12A, a recording head cartridge 10 includes an inkjet recording head 20 and an ink tank 40 detachably attached to the inkjet recording head 20.

The recording head cartridge 10 is retained and supported by a positioning member of a carriage (not shown) provided in an inkjet recording apparatus (not shown, hereinafter, referred to as recording apparatus). The recording head cartridge 10 is detachably attached to the carriage.

The inkjet recording head 20 drives a recording element in accordance with an electric signal sent from the recording apparatus and hence discharges ink, which is supplied from the ink tank 40 that contains the ink, through a discharge port provided in a recording element substrate H1101. For example, the recording element may be a heat element or a piezoelectric element. In the following description, the heat element is used as the recording element.

Figure 12B:
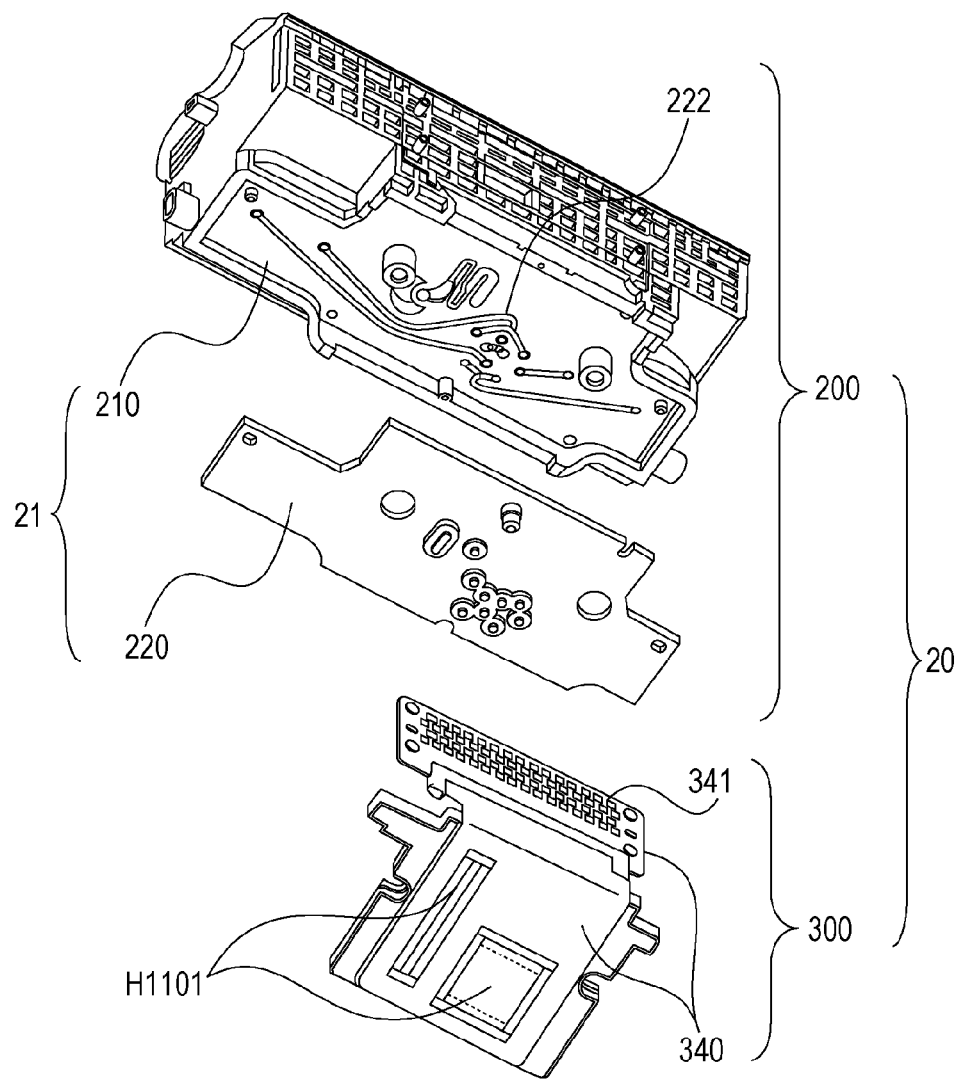
FIG. 12B illustrates the general inkjet recording head to which any of the embodiments of the present invention is applicable.

FIG. 12B is an exploded perspective view showing the inkjet recording head 20 shown in FIG. 12A. The inkjet recording head 20 includes a recording element unit 300 and a tank holder unit 200. The recording element unit 300 includes electrical wiring boards 340 and recording element substrates H1101.

Recording Element Unit

Next, the recording element unit 300 will be described.

The electrical wiring boards 340 include a connecting terminal 341 for electrical connection with respect to the recording apparatus, and electrode terminals (not shown) for electrical connection with respect to the recording element substrates H1101; wiring for connection between the connecting terminal 341 and the electrode terminals; and openings to which the recording element substrates H1101 are fitted.

The electrical wiring boards 340 are connected with the recording element substrates H1101, for example, as follows. Conductive thermosetting adhesive resin is applied on electrode portions of the recording element substrates H1101 and on the electrode terminals of the electrical wiring boards 340, and then the electrode portions and the electrode terminals are collectively heated and pressed by a heat tool. Thus, the electrical wiring boards 340 and the recording element substrates H1101 are collectively electrically connected with each other. The electrically connected portions between the electrode portions and the electrode terminals are sealed with a sealant and hence are protected from corrosion due to ink or from an external shock.

Figure 13:
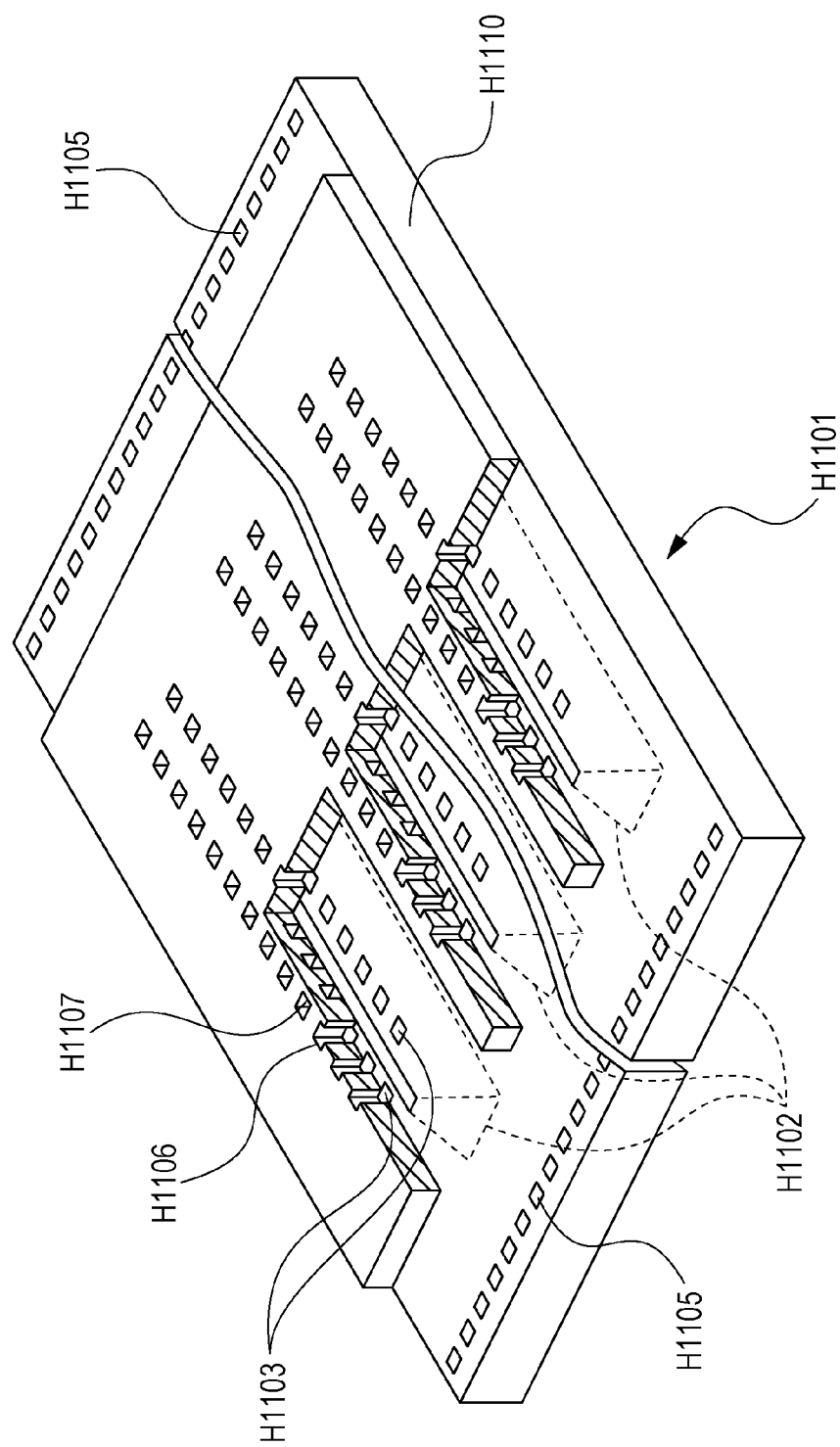
FIG. 13 is a perspective view showing a recording element substrate included in the general inkjet recording head.
Figure 14A:
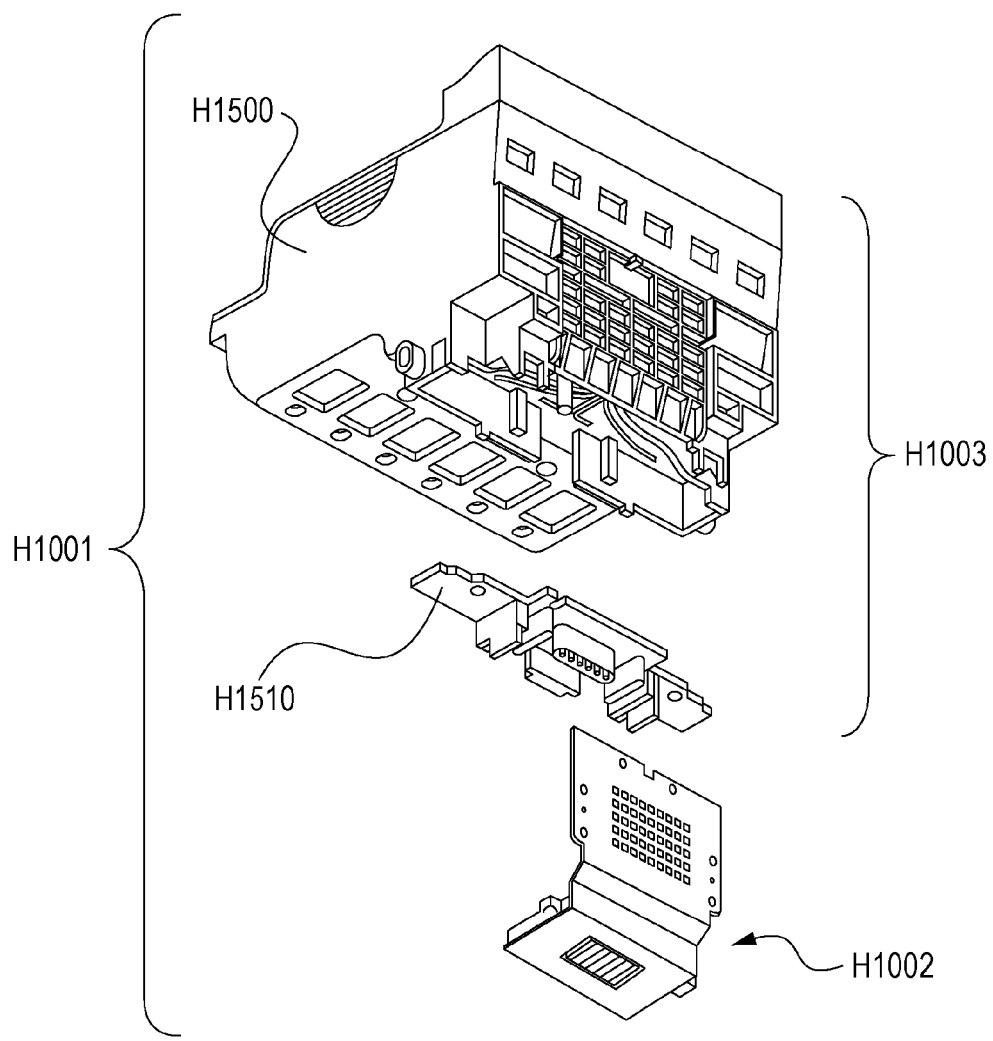
FIG. 14A is an explanatory view showing a general inkjet recording head of related art.
Figure 14B:
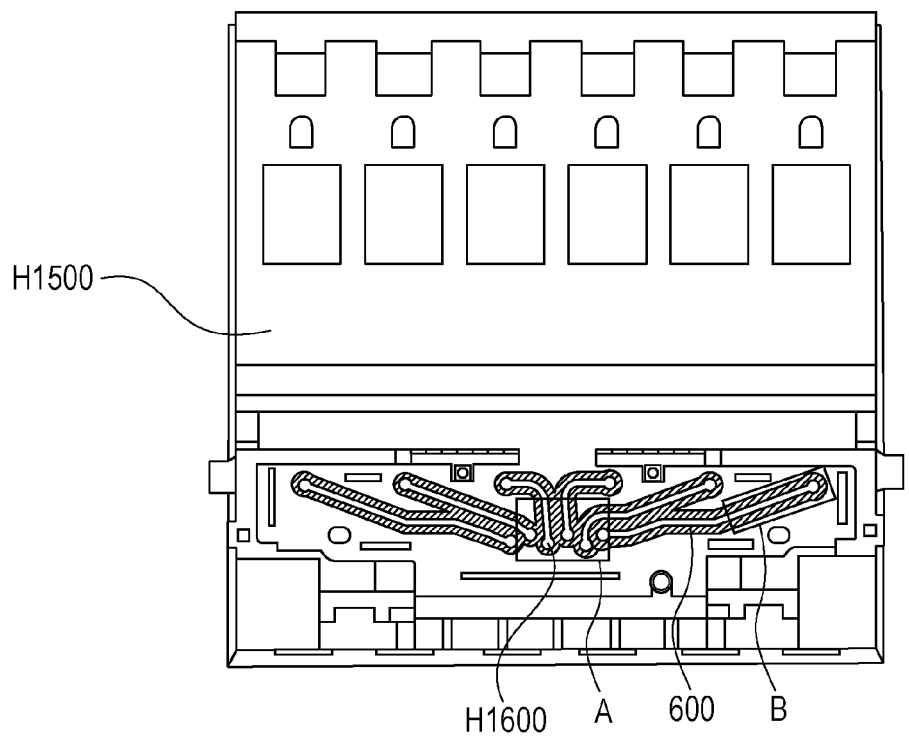
FIG. 14B is an explanatory view showing the general inkjet recording head of related art.
Figure 14C:
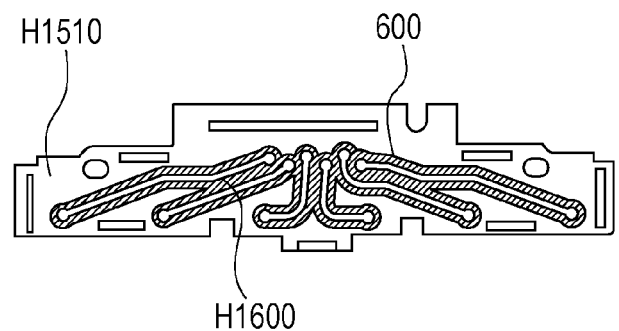
FIG. 14C is an explanatory view showing the general inkjet recording head of related art.
Figure 15:
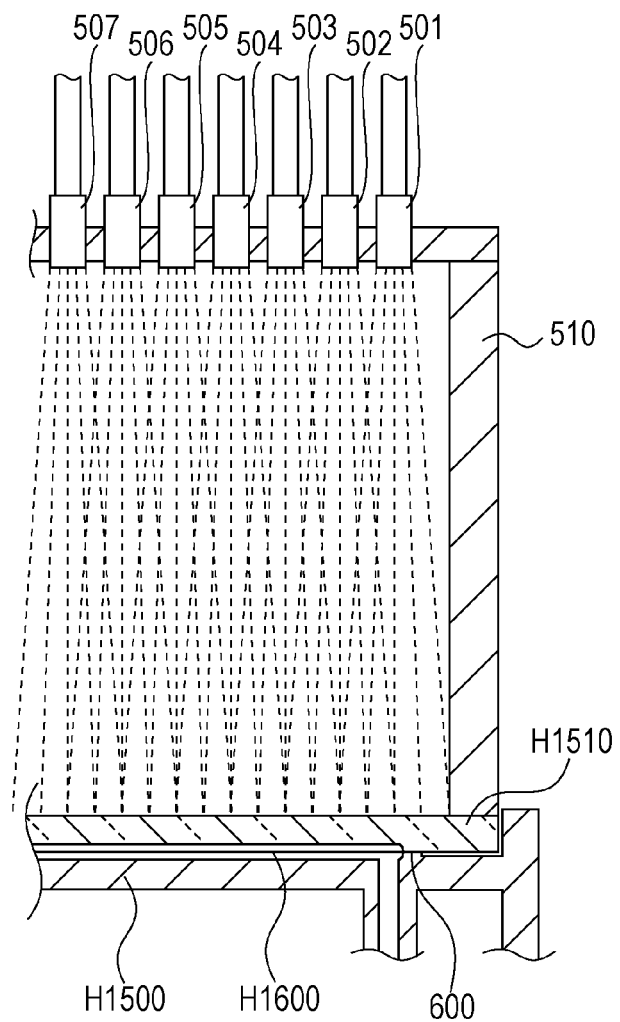
FIG. 15 illustrates problems to be addressed by the present invention.

FIG. 13 is a perspective view with part being sectioned for explaining the configuration of the recording element substrate H1101.

The recording element substrate H1101 has discharge ports H1107 that discharge ink, and ink supply ports H1102 that communicate with the discharge ports H1107 and supply the discharge ports H1107 with the ink. The discharge ports H1107 are formed in a discharge port forming member H1106. The ink supply ports H1102 are formed in a silicon substrate H1110.

The silicon substrate H1110 has a thickness in a range from 0.5 to 1.0 mm. The ink supply ports H1102 are formed by anisotropic etching. Also, heat elements H1103 are formed on the silicon substrate H1110. The discharge ports H1107 are formed in the silicon substrate H1110 by a photolithography technique such that the heat elements H1103 face the discharge ports H1107. Further, bumps H1105 made of, for example, Au, are provided on the silicon substrate H1110. The bumps H1105 serve as electrode portions that supply electric power and electric signals for driving the heat elements H1103.

Tank Holder Unit

The tank holder unit 200 included in an ink supply member 21 (liquid supply member) that is a feature of the present invention will be described below with reference to FIG. 12B.

The tank holder unit 200 holds the ink tank 40 serving as a liquid container. The tank holder unit 200 includes a tank holder 210 (absorption member) formed of a member being capable of absorbing a laser beam, and a plate-like transparent member 220 being transparent to a laser beam. When the transparent member 220 and the tank holder 210 are joined together by laser welding, the transparent member 220 and the tank holder 210 form the ink supply member 21 including a supply path that supplies the ink supply ports H1102 of the recording element substrate H1101 with ink.

The ink supply member 21 is arranged between the ink tank 40 and the recording element substrate H1101. The ink supply member 21 supplies the recording element substrate H1101 with the ink contained in the ink tank 40, through a supply path 224.

In this embodiment of the present invention, a supply path member having a groove 222 is integrally formed with the tank holder 210. However, the members may be formed as separate members, and then the supply path member formed of the material being capable of absorbing a laser beam may be attached to the tank holder 210.

In the embodiment shown in FIG. 12B, both the tank holder 210 and the transparent member 220 have grooves 222 for forming the supply path 224. In this embodiment, since the tank holder 210 and the transparent member 220 are joined together and hence form the supply path 224, either or both the tank holder 210 and the transparent member 220 may have a groove or grooves for forming a supply path.

To join the tank holder 210 and the transparent member 220 together by welding with a laser beam, one of the members has to be transparent to a laser beam and the other member has to be capable of absorbing a laser beam.

In this embodiment of the present invention, the tank holder 210 is formed of the absorption member and the plate-like member is the transparent member 220 because irradiation with a laser beam is easily performed with this configuration. The tank holder may have one of the transmittance and absorptance, and the plate-like member may have the other. These characteristics can be desirably assigned to these members.

In this embodiment of the present invention, a transparent member being transparent to a laser beam is a member having a transmittance of 30% or higher when a member with a thickness of 2.0 mm is irradiated with a laser beam. In this embodiment of the present invention, an absorption member being capable of absorbing a laser beam is a member having an absorptance of 90% or higher when a member with a thickness of 2.0 mm is irradiated with a laser beam. Since the members having the transmittance and absorptance are used, laser welding for the transparent member and the absorption member can be performed.

The following embodiments of the present invention, which will be described below, employ transparent Noryl, model number TPN9221, manufactured by SABIC Innovative Plastics Holding BV (which was GE Plastics Co., Ltd.), as the material of the transparent member. This transparent Noryl is a transparent material being transparent to a laser beam and being ink resistant. Alternatively, the material of the transparent member may be transparent Noryl, model number TN300, manufactured by the same company. This transparent Noryl does not contain a color material.

Here, Noryl is a trademark of modified polyphenylene ether or modified polyphenylene oxide. Noryl is obtained by modifying polyphenylene ether (polyphenylene oxide) to increase the heat resistance and strength of the material. Noryl belongs to thermosetting resin, and is highly acid and alkali resistant.

The material of the absorption member may be black Noryl, model number SE1X, manufactured by the same company. This black Noryl contains a dye or a pigment being capable of absorbing a laser beam.

Specific embodiments of the present invention will be described below with reference to the drawings.

First Embodiment

A first embodiment of the present invention will be described in detail with reference to FIGS. 1A to 5C.

Figure 2A:
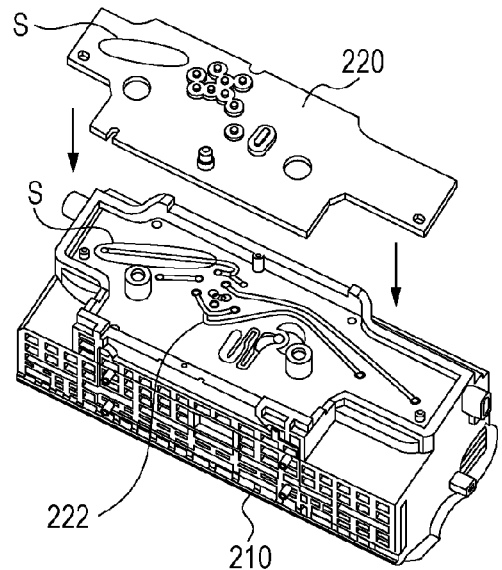
FIG. 2A is a perspective view showing a method for manufacturing a liquid supply member according to an embodiment of the present invention, the view showing a process of laser welding.
Figure 2B:
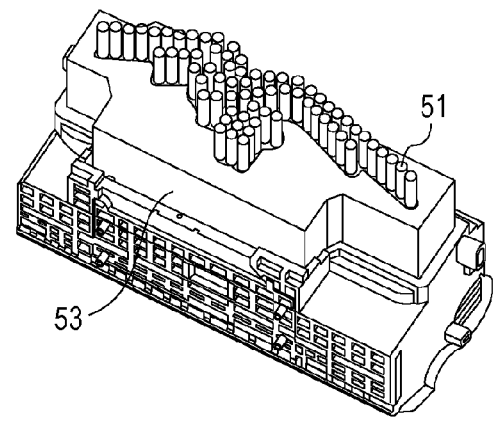
FIG. 2B is a perspective view showing the method for manufacturing the liquid supply member according to the embodiment, the view showing the process of laser welding.
Figure 2C:
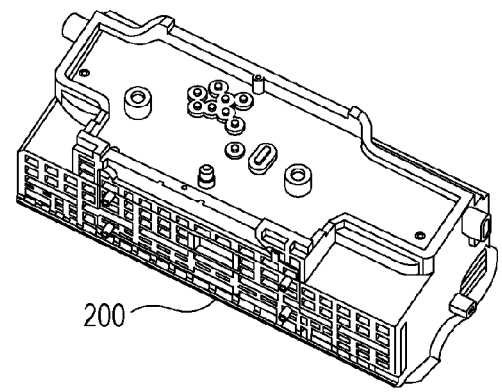
FIG. 2C is a perspective view showing the method for manufacturing the liquid supply member according to the embodiment, the view showing the process of laser welding.

A process of laser welding will be described with reference to FIGS. 2A to 2C. FIGS. 2A to 2C are perspective views showing steps for forming a supply path by attaching the transparent member 220 to the tank holder 210 (absorption member) formed of the member being capable of absorbing a laser beam.

Referring to FIG. 2A, the transparent member 220 and the tank holder 210 are prepared and are brought into contact with each other, with surfaces having the grooves 222 of both members inside.

Referring to FIG. 2B, after the step in FIG. 2A, a pressing jig 53 presses the transparent member 220 to bring the tank holder 210 and the transparent member 220 into close contact with each other. Then, a laser beam irradiation apparatus 51 simultaneously emits laser beams.

FIG. 2C shows a state in which the transparent member 220 and the tank holder 210 are joined together (tank holder unit 200).

Figure 3:
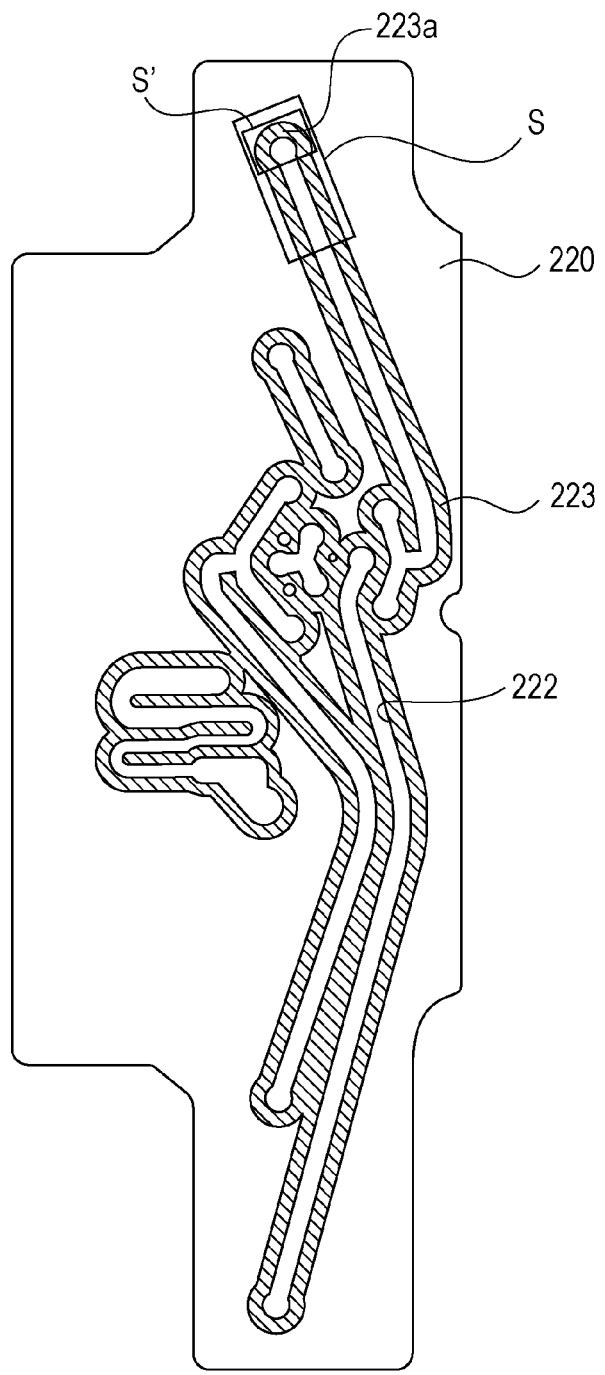
FIG. 3 is a plan view showing a transparent member used for the liquid supply member according to the embodiment of the present invention.

Next, arrangement of the grooves 222 for forming the supply path 224 of the ink supply member 21 will be described with reference to FIG. 3. FIG. 3 is a view of the transparent member 220 from a surface which is welded with the tank holder 210.

Referring to FIG. 3, in this embodiment, the arrangement of the grooves 222 includes a region where the grooves 222 are densely arranged and a region where the grooves 222 are sparsely arranged. The region where the grooves 222 are densely arranged includes a region where the grooves are closely arranged and a region where the grooves which form a single path are bent and closely arranged. The region where the grooves 222 are sparsely arranged is a region where the grooves are not closely arranged but the grooves which form a single path are solely arranged. The embodiment of the present invention is applied even if there is only the region where the grooves 222 are sparsely arranged.

Next, formation of the supply path 224 by laser welding will be specifically described below with reference to FIGS. 1A to 1C, 4A to 4C, and 5A to 5C.

Figure 4A:
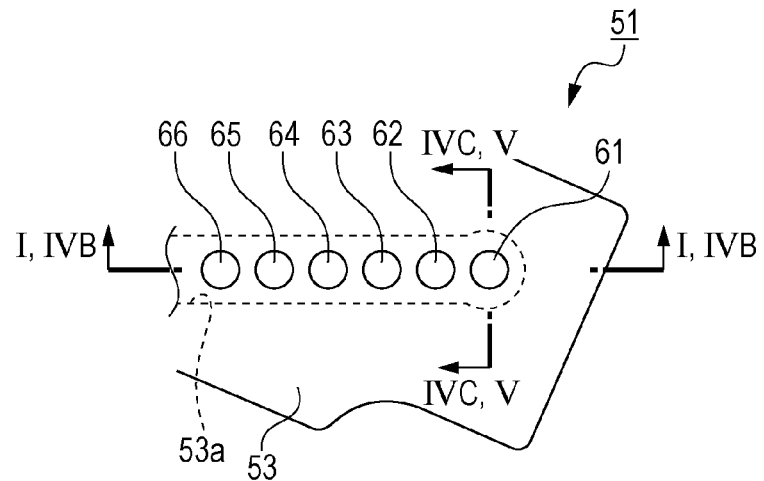
FIG. 4A illustrates the first embodiment of the present invention.
Figure 4B:
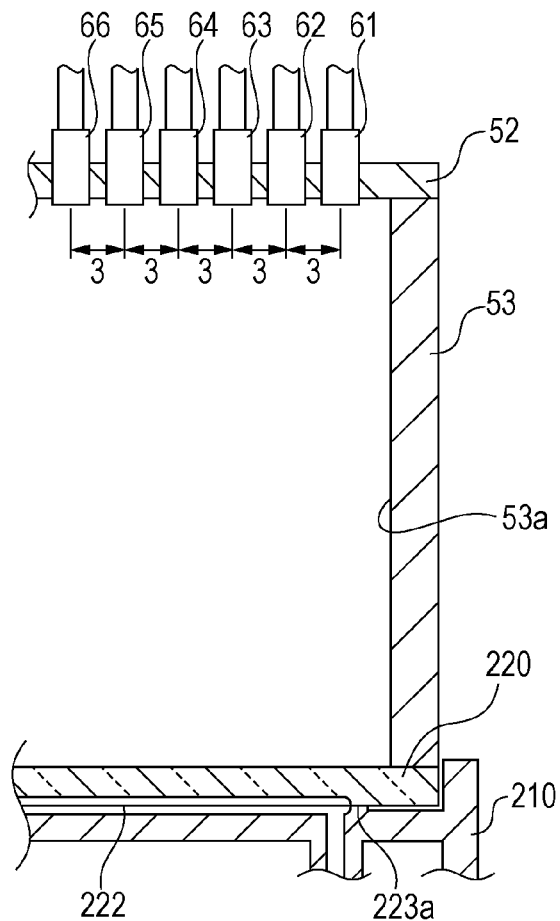
FIG. 4B illustrates the first embodiment.
Figure 4C:
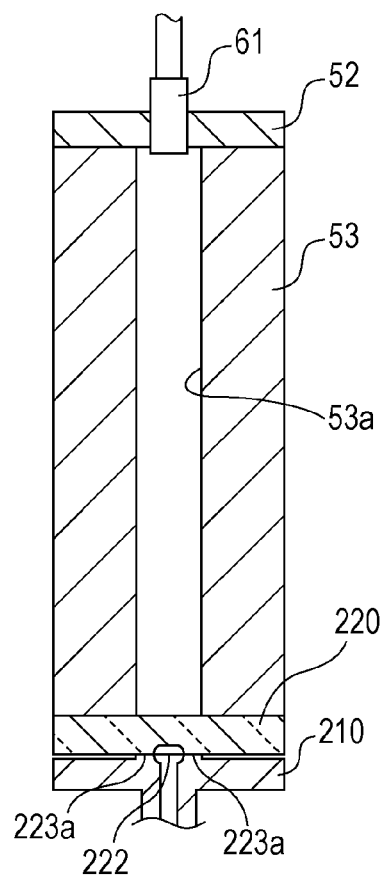
FIG. 4C illustrates the first embodiment.

FIGS. 4A to 4C illustrate an area in a vicinity of ends in a longitudinal direction of the grooves 222 in the region where the grooves 222 are sparsely arranged (for example, region S in FIG. 2A) during laser beam irradiation in FIG. 2B. FIG. 4A is a view of the area in a vicinity of the ends in the state in FIG. 2B, from a laser-beam irradiation side.

Figure 1A:
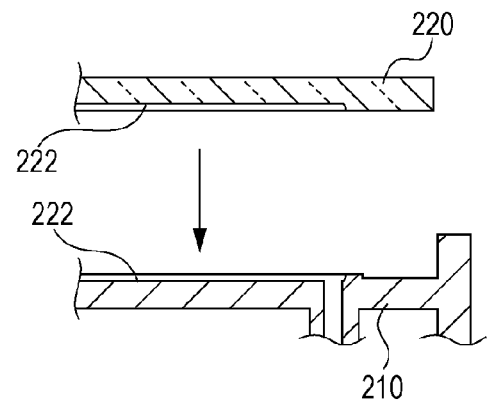
FIG. 1A illustrates a first embodiment of the present invention.
Figure 1B:
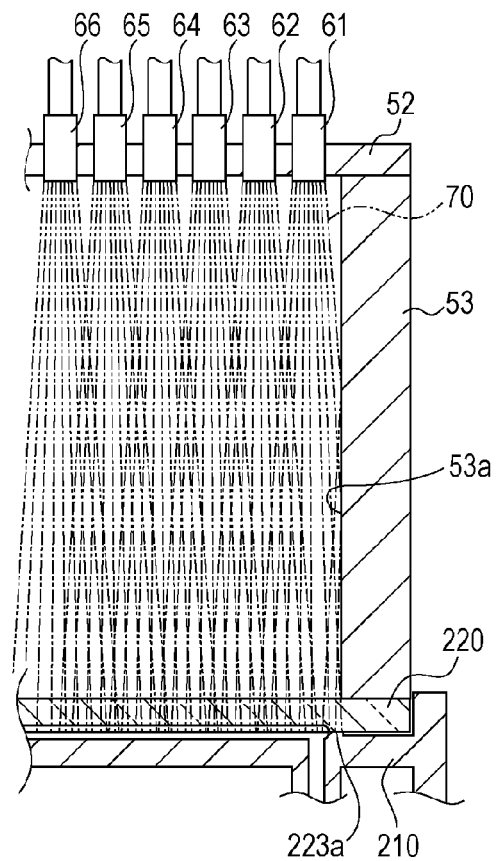
FIG. 1B illustrates the first embodiment.
Figure 1C:
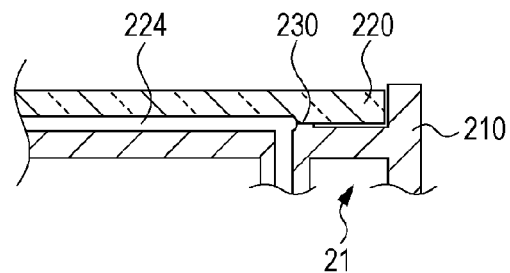
FIG. 1C illustrates the first embodiment.

FIGS. 1A to 1C are cross-sectional views taken along line I-I in FIG. 4A, for explaining formation of an ink supply member by laser welding. FIGS. 2A to 2C respectively correspond to FIGS. 1A to 1C.

Figure 5A:
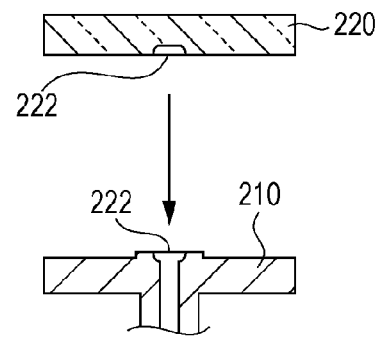
FIG. 5A illustrates the first embodiment of the present invention.
Figure 5B:
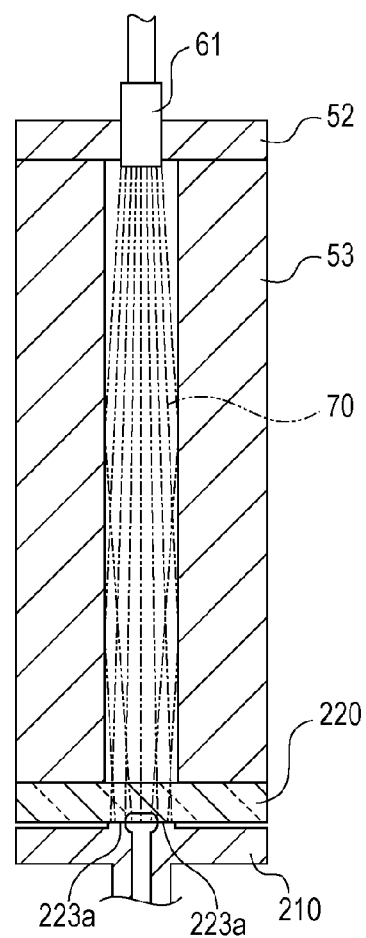
FIG. 5B illustrates the first embodiment.
Figure 5C:
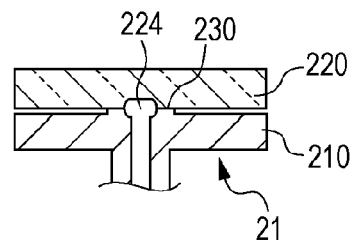
FIG. 5C illustrates the first embodiment.

FIGS. 5A to 5C are cross-sectional views taken along line V-V in FIG. 4A, for explaining the formation of the ink supply member by laser welding. FIGS. 2A to 2C respectively correspond to FIGS. 5A to 5C.

Referring to FIGS. 1A to 1C and 5A to 5C, in this embodiment, both the tank holder 210 and the transparent member 220 have the grooves 222 for forming the supply path 224.

When the tank holder 210 and the transparent member 220 are brought into contact with each other with the grooves 222 inside, both members are brought into contact with each other at contact portions surrounding the grooves 222 provided at the tank holder 210 and the transparent member 220. FIG. 3 illustrates a contact portion 223, which is indicated by oblique lines, of the transparent member 220 with respect to the tank holder 210. The contact portion 223 is provided in a vicinity of the grooves 222 to surround the grooves 222.

Outer peripheral portions of the contact portions 223 at which both members are brought into contact with each other are non-contact portions at which both members are not brought into contact with each other.

Since the contact portions and the non-contact portions are provided, when the tank holder 210 and the transparent member 220 are brought into contact with each other, a pressure is concentrated only at the contact portions 223, and hence adhesion between both members can be increased.

Referring to FIGS. 1B and 5B, when the contact portions 223 are irradiated with laser beams, heat is generated at a dye or a pigment contained in the tank holder 210 and hence resin is melted. The generated heat is transmitted to the transparent member 220. The transmitted heat melts the transparent member 220. The contact portions 223 become a joint portion 230. When the tank holder 210 and the transparent member 220 are welded, the grooves 222 form the supply path 224.

Next, the laser beam irradiation apparatus 51 will be described with reference to FIGS. 4A to 4C. FIG. 4B is a cross-sectional view taken along line IVB-IVB in FIG. 4A. FIG. 4C is a cross-sectional view taken along line IVC-IVC in FIG. 4A.

The laser beam irradiation apparatus 51 includes a plurality of laser beam irradiators (laser beam sources) 61 to 66, a fixing plate 52 that fixes the laser beam irradiators 61 to 66, and a pressing jig 53 that presses the transparent member 220 against the tank holder 210.

Referring to FIG. 2B, the laser beam irradiators are arranged above the grooves 222 along the grooves 222. In this embodiment, the distance between the centers of the adjacent laser beam irradiators is about 3 mm. The plurality of laser beam irradiators are arranged at uniform intervals. If grooves for a supply path have fine structures, like the ink supply member 21 used for the inkjet recording head 20, laser beam irradiators each having a laser beam aperture with a larger diameter than a width of the supply path is used. Hence, during laser welding, the grooves 222 and the contact portions 223 are entirely irradiated with laser beams.

For example, laser beams are of a semiconductor laser (that emits laser beams with a wavelength of 980 nm). However, the type of laser beams is not limited, and may be any type as long as the type of laser beams has a wavelength that is transmitted through the transparent member 220.

The pressing jig 53 is a device that prevents laser beams from leaking outside when the laser beams are simultaneously emitted from the plurality of laser beam irradiators, and that guides the laser beams to the contact portions 223 between the tank holder 210 and the transparent member 220. The pressing jig 53 has an inner wall 53a indicated by a dotted line in FIG. 4A. The inner wall 53a has a shape corresponding to shapes of the contact portions 223. Also, the inner wall 53a uses a member that can easily reflect a laser beam. For example, the inner wall 53a is processed by gold plating. Thus, a laser beam reflected to the inner wall 53a can be efficiently emitted on the contact portions 223.

Described next is an irradiation amount with laser beams for end contact portions 223a (first portions) located in a vicinity of the ends in the longitudinal direction of the grooves 222 in the region where the grooves 222 are sparsely arranged (for example, region S shown in FIGS. 2A and 3), as a feature of the present invention. The end contact portions 223a are, for example, contact portions between the tank holder 210 and the transparent member 220 in a region S' shown in FIG. 3.

In the first embodiment, the laser beam irradiator 61 arranged above the ends in the longitudinal direction of the grooves 222 is high power type (4.0 W), whereas the other laser beam irradiators are normal power type (2.5 W). Accordingly, a total irradiation amount per unit area with laser beams for the end contact portions 223a can be larger than a total irradiation amount per unit area with the laser beams for part with a smallest irradiation amount of contact portions (second portions) other than the end contact portions 223a (other than the first portions) of the contact portions 223. In this embodiment, the laser beams are emitted such that even the part with the smallest total irradiation amount per unit area is properly welded. By increasing the irradiation amount for the end contact portions 223a than that for the part, the irradiation amount with the laser beams for the end contact portions 223a can be sufficiently provided. Also, the amount of heat radiation from the ends, the amount which has been larger than that of the other part, can be decreased.

A heat quantity required for laser welding can be provided even for the end contact portions 223a located in a vicinity of the ends in the longitudinal direction of the grooves 222. Accordingly, likelihood of appearance of a not-welded portion due to insufficient welding can be reduced. The ink supply member without ink leakage to the outside can be provided.

In this embodiment, only the laser beam irradiator 61 located above the ends in the longitudinal direction of the grooves 222 is high power type. Alternatively, both the laser beam irradiators 61 and 62 may be high power type. Still alternatively, only the laser beam irradiator 62 may be high power type. That is, any (first laser beam source) of laser beam irradiators arranged at positions at which the laser beam irradiators can irradiate the end contact portions 223a may have a higher power than the power of a laser beam irradiator (second laser beam source) other than the first laser beam source.

Also, laser beam irradiators with different powers do not have to be used. Laser beam irradiators with adjustable powers of laser beams may be used, and the power of the laser beam irradiator arranged at the position at which the laser beam irradiator can irradiate the end contact portions with laser beams may be higher than a power of the other laser beam irradiator.

This embodiment in FIGS. 2A to 2C has a configuration in which the laser beam irradiators are arranged in line in a long-side direction (longitudinal direction) of the grooves 222. Alternatively, a set of plural laser beam irradiators may be arranged at positions in a short-side direction of the grooves, and plural sets of laser beam irradiators may be arranged in the longitudinal direction of the grooves.

If the laser beam irradiator that irradiates the portion, which may be insufficiently welded, is the high power type like this embodiment, a time required for welding can be equalized for the entire region. Thus, productivity during manufacturing is good.

As described above, if the plurality of laser beam irradiators with substantially the same laser beam intensities are arranged at uniform intervals and the laser beam irradiators simultaneously emit the laser beams to cause the members to be welded by laser welding, the not-welded portion may appear in the region where the grooves are sparsely arranged. In contrast, if the region where the grooves are densely arranged is excessively irradiated with the laser beams, the members may be foamed, the supply path may be deformed, and ink flowability may be degraded. To address this, the power of the laser beam irradiator that irradiates the region where the grooves are densely arranged is decreased as compared with the power of the laser beam irradiator that irradiates the other region. Accordingly, the supply path can be prevented from being deformed, and a uniform welded state can be obtained.

Second Embodiment

Next, a second embodiment of the present invention will be described with reference to FIGS. 6 and 7.

The method for laser welding and the configuration of the ink supply member 21 are similar to those of the first embodiment, and hence the redundant description will be omitted.

Like the first embodiment, a set of plural laser beam irradiators may be arranged at positions in the short-side direction of the grooves, and plural sets of laser beam irradiators may be arranged in the longitudinal direction of the grooves.

In the second embodiment, the ink supply member 21 is formed by the process of laser welding similar to that of the first embodiment shown in FIGS. 2A to 2C. In the first embodiment, at least one of the laser beam irradiators is expensive high power type. However, in the second embodiment, laser beam irradiators of normal power type are used. Thus, the laser beam irradiators have substantially the same powers. This is applied to subsequent embodiments.

Figure 6A:
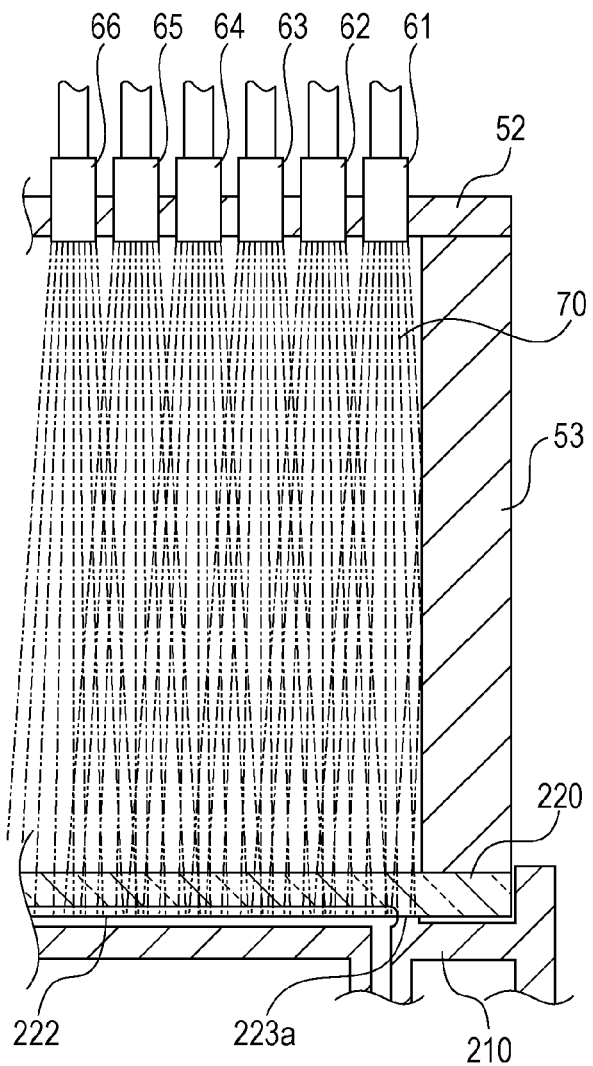
FIG. 6A illustrates a second embodiment of the present invention.
Figure 6B:
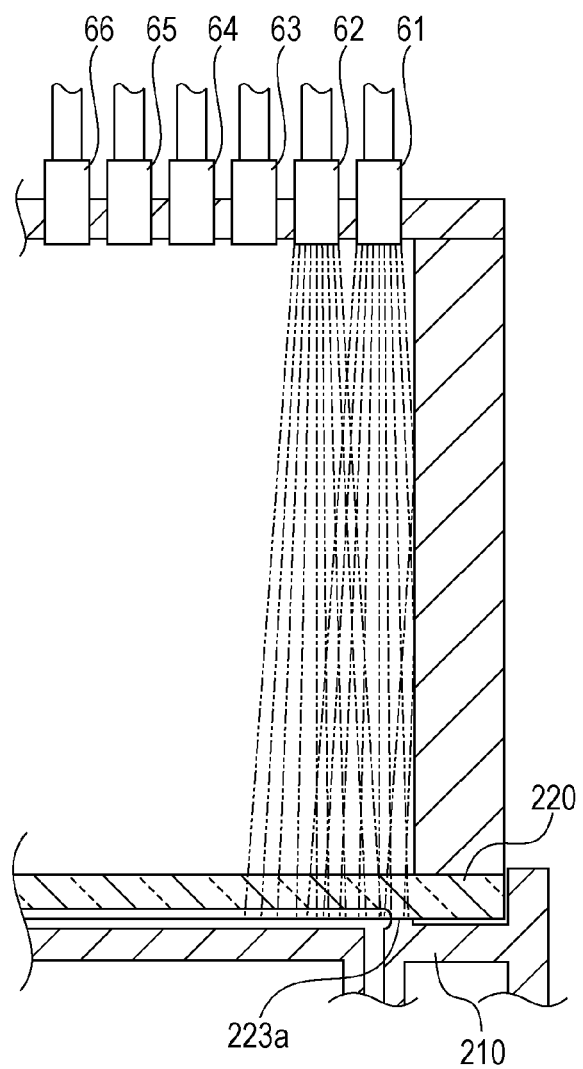
FIG. 6B illustrates the second embodiment.
Figure 6C:
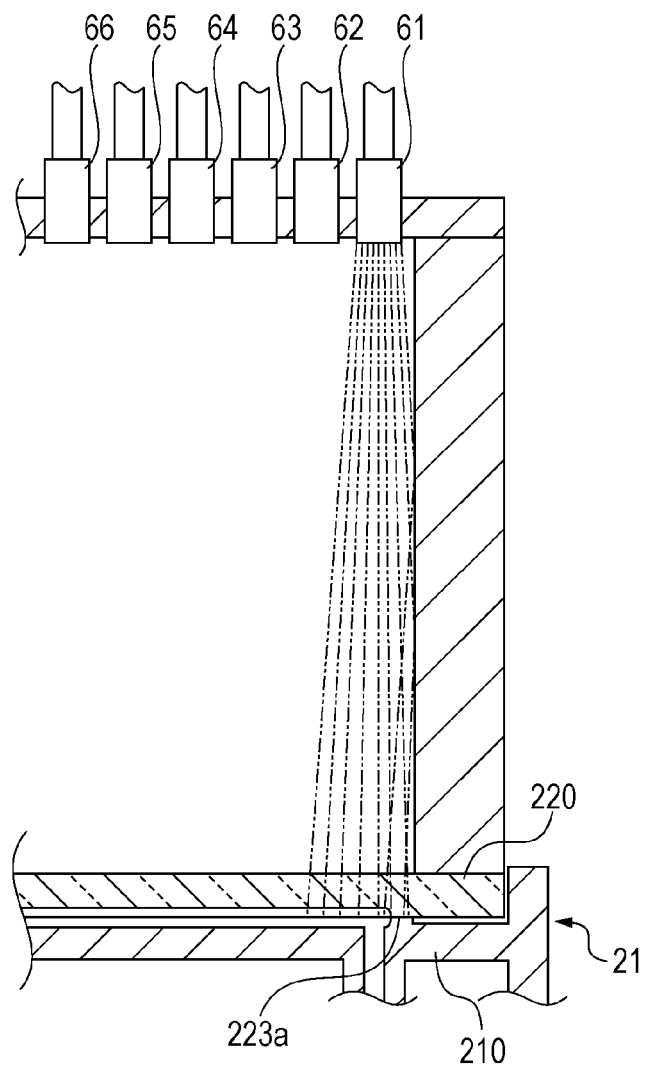
FIG. 6C illustrates the second embodiment.
Figure 7:
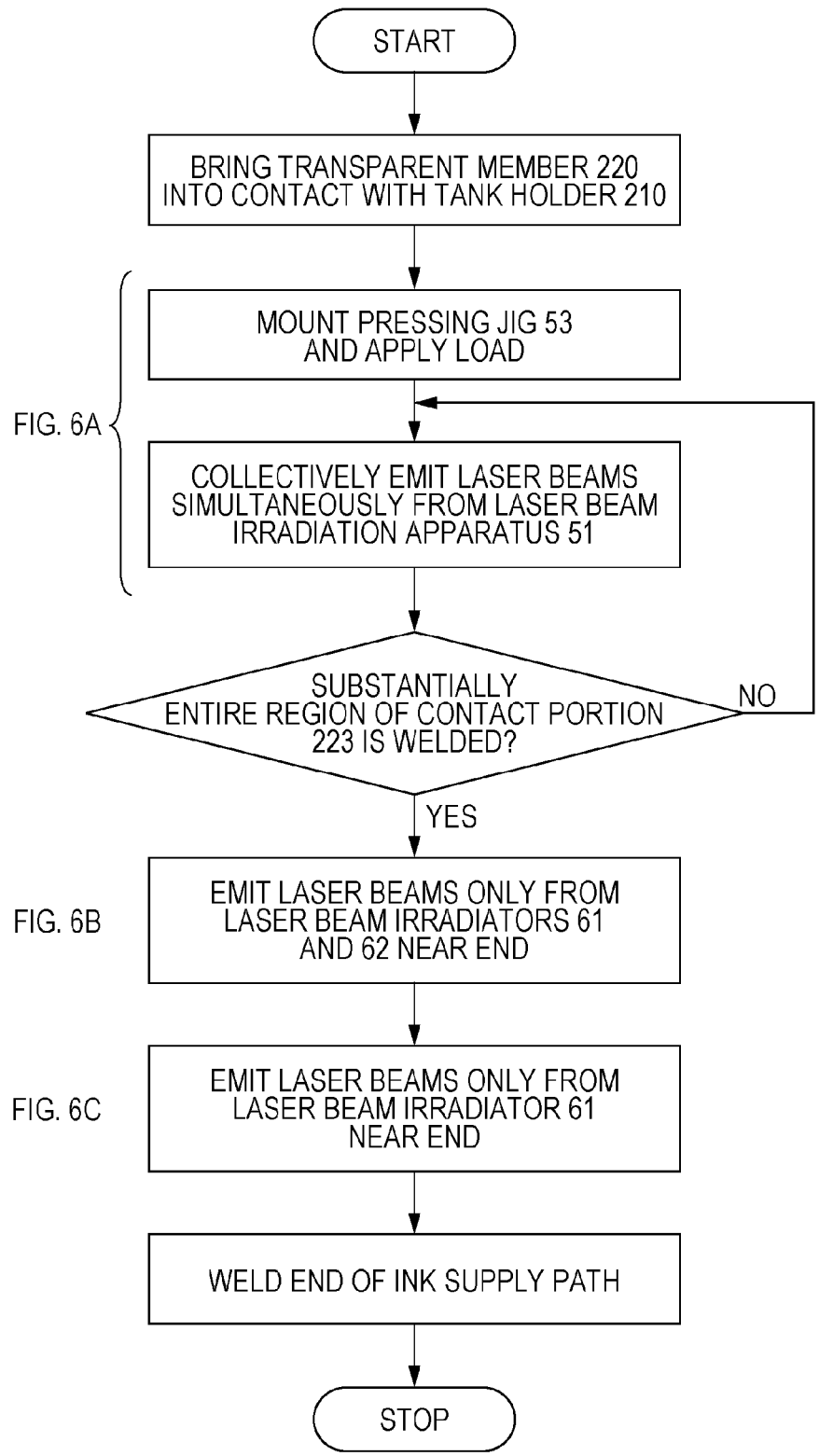
FIG. 7 is a flowchart for explaining the second embodiment of the present invention.

FIGS. 6A to 6C illustrate a method for irradiating laser beams according to this embodiment for the area in a vicinity of the ends in the longitudinal direction of the grooves 222 in the region where the grooves 222 are sparsely arranged (for example, region S in FIG. 2A). FIG. 7 is a flowchart showing the method for irradiating laser beams according to this embodiment. FIG. 6A, FIG. 6B, and FIG. 6C respectively correspond to sections named FIG. 6A, FIG. 6B, and FIG. 6C in the flowchart in FIG. 7.

As shown in FIG. 6A, all the laser beam irradiators irradiate the contact portions 223 simultaneously with laser beams until substantially the entire contact portions other than the end contact portions 223a, which are located in a vicinity of the ends in the longitudinal direction of the grooves 222, are welded. Then, as shown in FIG. 6B, only the laser beam irradiators 61 and 62, which are located in a vicinity of and above the ends in the longitudinal direction of the grooves 222, emit the laser beams, and the irradiation by the other laser beam irradiators is ended. Further, as shown in FIG. 6C, the irradiation by the laser beam irradiator 62 is ended, and the irradiation by the laser beam irradiator 61 is continued.

As described above, an irradiation time by the laser beam irradiator located at the position at which the laser beam irradiator can irradiate the end contact portions 223a located in a vicinity of the ends in the longitudinal direction of the grooves 222 with the laser beams is increased as compared with an irradiation time by the other laser beam irradiators. At this time, a total irradiation amount per unit area with the laser beams for the end contact portions 223a is increased as compared with a total irradiation amount per unit area with the laser beams for part with a smallest total irradiation amount of the contact portions other than the end contact portions 223a of the contact portions 223. Accordingly, likelihood of appearance of a not-welded portion due to insufficient welding can be reduced, and the ink supply member without ink leakage to the outside can be provided, like the first embodiment.

In this embodiment, the irradiation time by the laser beam irradiators 61 and 62 are increased as compared with the irradiation time by the other laser beam irradiators. However, any of the laser beam irradiators located at the position at which the laser beam irradiator can irradiate the end contact portion 223a with the laser beams can be increased as compared with the other laser beam irradiators.

Third Embodiment

Figure 8A:
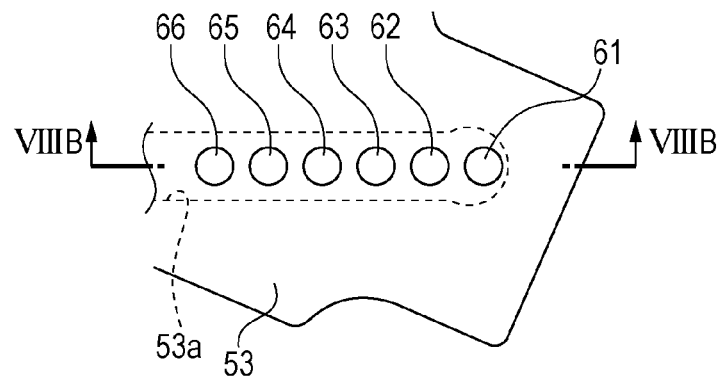
FIG. 8A illustrates a third embodiment of the present invention.

Next, a third embodiment of the present invention will be described with reference to FIGS. 8A and 8B.

In the third embodiment, like the above-described embodiments, the ink supply member 21 is formed by the steps for laser welding in FIGS. 2A to 2C. However, a feature in this embodiment is arrangement of laser beam irradiators.

Similarly to the above-described embodiments, a set of plural laser beam irradiators may be arranged at positions in the short-side direction of the grooves, and plural sets of laser beam irradiators may be arranged in the longitudinal direction of the grooves. FIGS. 8A and 8B illustrate arrangement of laser beam irradiators according to this embodiment for the area in a vicinity of the ends in the longitudinal direction of the grooves 222 in the region where the grooves 222 are sparsely arranged (for example, region S in FIG. 2A). FIG. 8A is a view of the area in a vicinity of the ends in the state in FIG. 2B, from the laser-beam irradiation side. FIG. 8B is a cross-sectional view taken along line VIIIB-VIIIB in FIG. 8A.

Figure 8B:
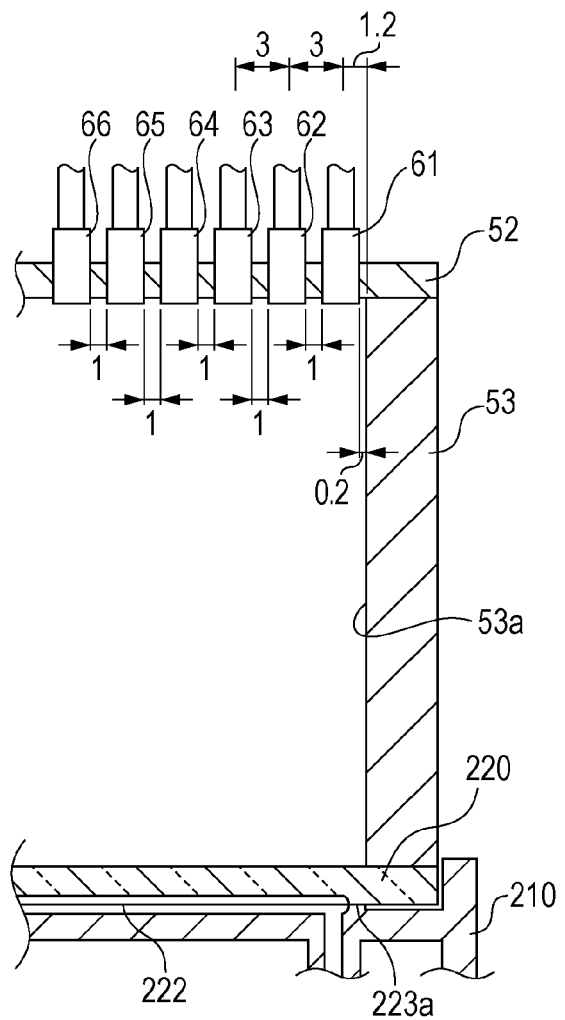
FIG. 8B illustrates the third embodiment.

In this embodiment, referring to FIG. 8B, the distance between the adjacent laser beam irradiators is 3 mm, and the positions of the laser beam irradiators are entirely shifted toward the ends in the longitudinal direction of the grooves 222. In particular, the distance between the laser beam irradiator 61 and the inner wall 53a of the pressing jig 53 is decreased as compared with the distance between the adjacent laser beam irradiators in the longitudinal direction. The inner wall 53a serves as a reflection member that reflects a laser beam. In FIG. 8B, the distance between the laser beam irradiator 61 and the inner wall 53a of the pressing jig 53 is 1.2 mm. The distance between the laser beam irradiator 61 and the inner wall 53a may be desirably equal to or smaller than the half the distance between the adjacent laser beam irradiators (in this embodiment, 3 mm).

Since the laser beam irradiator 61 is arranged close to the inner wall 53a of the pressing jig 53 using a material that likely reflects a laser beam, the inner wall 53a reflects a laser beam, and the reflected beam is emitted on the end contact portions 223a. At this time, a total irradiation amount per unit area with the laser beams for the end contact portions 223a is increased as compared with a total irradiation amount per unit area with the laser beams for part with a smallest total irradiation amount of the contact portions other than the end contact portions 223a of the contact portions 223 by the reflected beam. Accordingly, likelihood of appearance of a not-welded portion due to insufficient welding can be reduced. The ink supply member without ink leakage to the outside can be provided like the first embodiment.

Fourth Embodiment

Next, a fourth embodiment of the present invention will be described with reference to FIGS. 9A and 9B.

In the fourth embodiment, like the above-described embodiments, the ink supply member 21 is formed by the steps for laser welding in FIGS. 2A to 2C.

Similarly to the above-described embodiments, a set of plural laser beam irradiators may be arranged at positions in the short-side direction of the grooves, and plural sets of laser beam irradiators may be arranged in the longitudinal direction of the grooves.

Figure 9A:
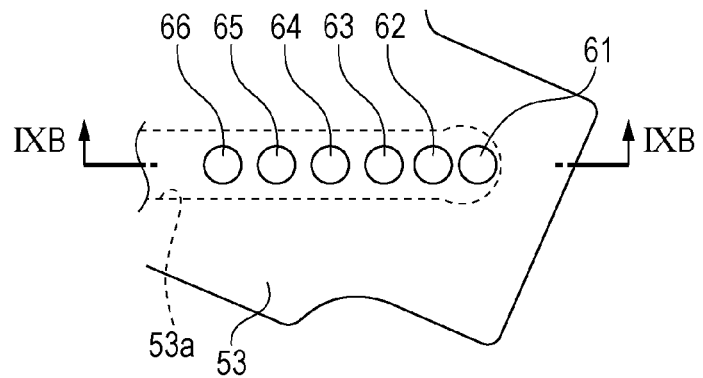
FIG. 9A illustrates a fourth embodiment of the present invention.
Figure 9B:
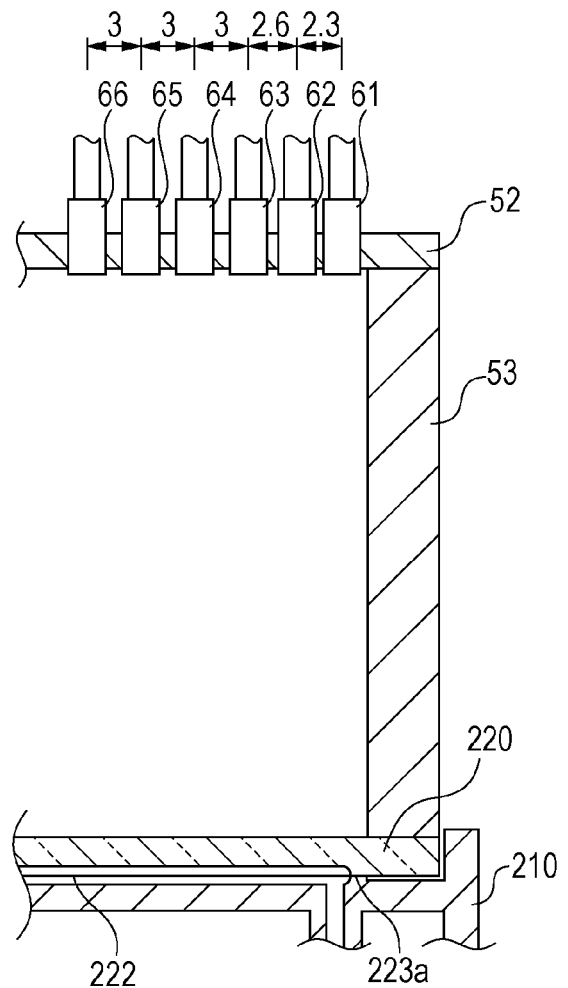
FIG. 9B illustrates the fourth embodiment.

FIGS. 9A and 9B illustrate arrangement of laser beam irradiators according to this embodiment for the area in a vicinity of the ends in the longitudinal direction of the grooves 222 in the region where the grooves 222 are sparsely arranged (for example, region S in FIG. 2A). FIG. 9A is a view of the area in a vicinity of the ends in the state in FIG. 2B, from the laser-beam irradiation side. FIG. 9B is a cross-sectional view taken along line IXB-IXB in FIG. 9A.

In this embodiment, the distances between the adjacent laser beam irradiators 61 to 63, which are arranged in a vicinity of the ends in the longitudinal direction of the grooves 222, are smaller than the distance between the other adjacent laser beam irradiators. Referring to FIG. 9B, the distances of the adjacent laser beam irradiators are decreased from 3 mm, 2.6 mm, and then 2.3 mm toward the ends of the grooves. Hence, a total irradiation amount per unit area with the laser beams for the end contact portions 223a is increased as compared with a total irradiation amount per unit area with the laser beams for part with a smallest total irradiation amount of the contact portions other than the end contact portions 223a of the contact portions 223. Accordingly, likelihood of appearance of a not-welded portion due to insufficient welding can be reduced, and the ink supply member without ink leakage to the outside can be provided.

The distances between the adjacent laser beam irradiators (first laser beam sources), which are located at the positions at which the laser beam irradiators can irradiate the end contact portions 223a with the laser beams and which are adjacent to each other in the longitudinal direction of the grooves, may be smaller than the distance between the other adjacent laser beam irradiators (second laser beam sources). Specific arrangement of the laser beam irradiators is not limited to the above arrangement as long as part of the laser beam irradiators is arranged as described above.

Fifth Embodiment

Next, a fifth embodiment of the present invention will be described with reference to FIGS. 10A and 10B, and 11A and 11B.

In the fifth embodiment, like the above-described embodiments, the ink supply member 21 is formed by the steps for laser welding in FIGS. 2A to 2C.

Similarly to the above-described embodiments, a set of plural laser beam irradiators may be arranged at positions in the short-side direction of the grooves, and plural sets of laser beam irradiators may be arranged in the longitudinal direction of the grooves.

Figure 10A:
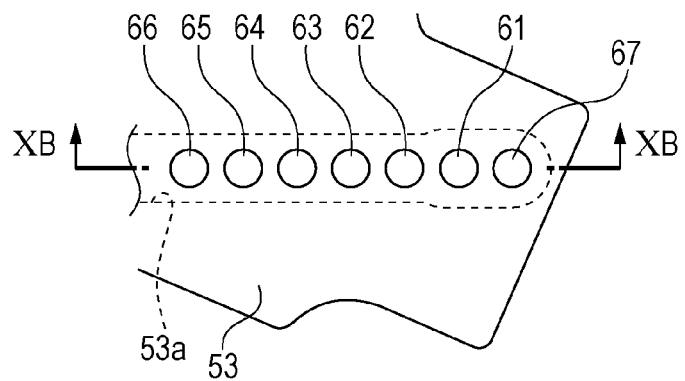
FIG. 10A illustrates a fifth embodiment of the present invention.
Figure 10B:
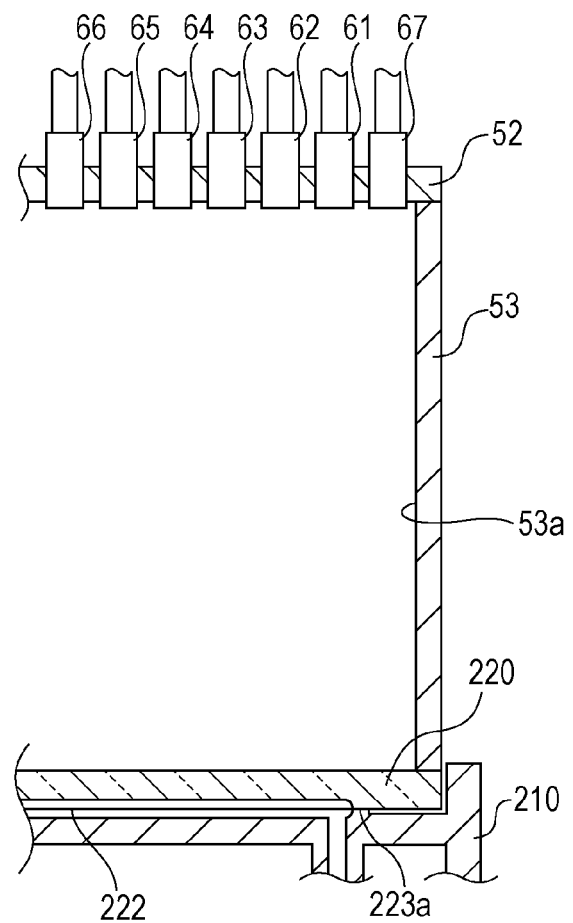
FIG. 10B illustrates the fifth embodiment.
Figure 11A:
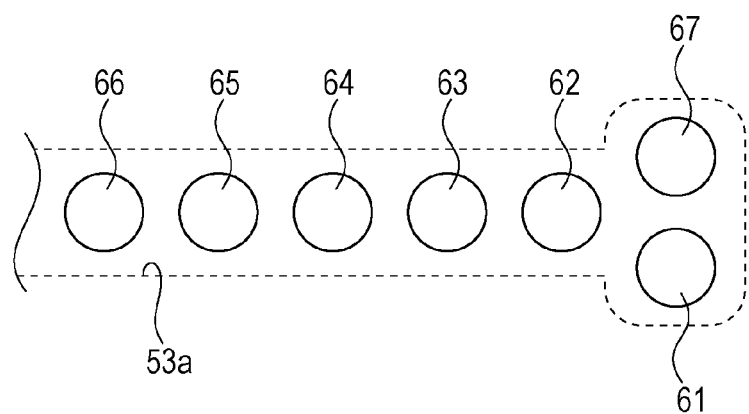
FIG. 11A illustrates a modification of the fifth embodiment of the present invention.
Figure 11B:
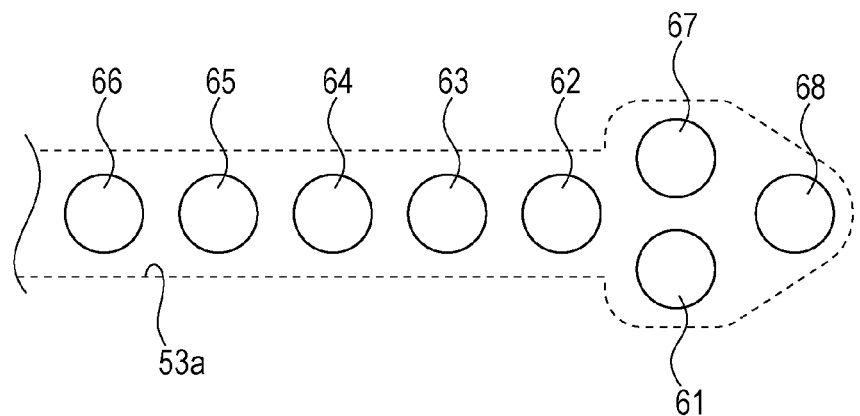
FIG. 11B illustrates another modification of the fifth embodiment.

FIGS. 10A and 10B illustrate arrangement of laser beam irradiators according to this embodiment for the area in a vicinity of the ends in the longitudinal direction of the grooves 222 in the region where the grooves 222 are sparsely arranged (for example, region S in FIG. 2A). FIG. 10A is a view of the area in a vicinity of the ends in the state in FIG. 2B, from the laser-beam irradiation side. FIG. 10B is a cross-sectional view taken along line XB-XB in FIG. 10A. Also, FIGS. 11A and 11B illustrate modifications of this embodiment. Like FIG. 10A, FIGS. 11A and 11B illustrate arrangements of laser beam irradiators in a vicinity of the ends.

A feature of the fifth embodiment is arrangement of laser beam irradiators. Referring to FIGS. 10A and 10B, a laser beam irradiator 67 is additionally arranged next to the laser beam irradiator 61 on an extension from the grooves in the longitudinal direction.

Hence, a total irradiation amount per unit area with the laser beams for the end contact portions 223a is increased as compared with a total irradiation amount per unit area with the laser beams for part with a smallest total irradiation amount of the contact portions other than the end contact portions 223a of the contact portions 223. Accordingly, likelihood of appearance of a not-welded portion due to insufficient welding can be reduced, and the ink supply member without ink leakage to the outside can be provided.

A feature of this embodiment is merely additionally arranging the laser beam irradiator that irradiates the end contact portions 223a with the laser beams and hence increasing the irradiation amount for the end contact portions 223a. The arrangement of the additionally provided irradiator is not particularly limited. For example, referring to FIG. 11A, the laser beam irradiators 61 and 67 may be arranged above the ends of the grooves 222 side by side in a direction intersecting with the longitudinal direction of the grooves 222. Alternatively, referring to FIG. 11B, another laser beam irradiator 68 may be additionally arranged on an extension from the groove 222.

Each of the above-described first to fifth embodiments provides the increase in irradiation amount with laser beams for the end contact portions 223a provided in a vicinity of the ends in the longitudinal direction of the grooves. However, at least two of the first to fifth embodiments may be combined.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-263076, filed Nov. 18, 2009, which is hereby incorporated by reference herein in its entirety.

REFERENCE SIGNS LIST 21 ink supply member (liquid supply member)
51 laser beam irradiation apparatus
70 laser beam
210 tank holder (absorption member)
220 transparent member
222 groove
223 contact portion
223a end contact portion (first portion)
224 ink supply member (supply member)

The invention claimed is:

1. A method for manufacturing a liquid supply member that supplies liquid to a discharge port that discharges liquid, the method comprising:
preparing a transparent member being transparent to a laser beam and an absorption member for absorbing a laser beam, at least one of the transparent member and the absorption member having a groove for forming a supply path that supplies the discharge port with liquid;
bringing the transparent member and the absorption member into contact with each other, with the groove inside;
arranging a plurality of laser beam sources along a longitudinal direction of the groove, each of the laser beam sources having a laser beam aperture with a diameter such that the groove is entirely irradiated with laser beams; and
forming the supply path by emitting laser beams simultaneously from the plurality of laser beam sources, via the transparent member, toward a contact portion, which is provided in a vicinity of the groove and at which the transparent member and the absorption member are in contact, to weld the transparent member and the absorption member at the contact portion,
wherein the laser beams are emitted during the forming step such that a total irradiation amount per unit area with laser beams for a first portion that are included in the contact portion and located in a vicinity of an end in the longitudinal direction of the groove is larger than a total irradiation amount per unit area with laser beams for a second portion other than the first portion of the contact portion.

2. The method for manufacturing the liquid supply member according to claim 1, wherein the plurality of laser beam sources include at least a first laser beam source and a second laser beam source that is other than the first laser beam source, the first laser beam source being provided at a position at which the first laser beam source can irradiate the first portion with the laser beams, the first laser beam source having a higher power than a power of the second laser beam source.

3. The method for manufacturing the liquid supply member according to claim 1, wherein the plurality of laser beam sources include at least a first laser beam source and a second laser beam source that is other than the first laser beam source, the first laser beam source can irradiate the first portion with laser beams, the first laser beam source having a longer irradiation time than an irradiation time of the second laser beam source.

4. The method for manufacturing the liquid supply member according to claim 1, wherein the plurality of laser beam sources include a plurality of first laser beam sources and a plurality of second laser beam sources that are other than the first laser beam sources, the first laser beam sources being provided at positions at which the first laser beams sources can irradiate the first portion with laser beams, a distance between two adjacent first laser beam sources is smaller than a distance between two adjacent second laser beam sources.

5. The method for manufacturing the liquid supply member according to claim 1, wherein the plurality of laser beam sources include at least a first laser beam source and a second laser beam source that is other than the first laser beam source, the first laser beam source being provided at a position at which the first laser beam source can irradiate the first portion with laser beams, a distance between the first laser beam source and a reflection member that is provided on an extension in the direction from the end and reflects laser beams to irradiate the first portion is smaller than a distance between the first laser beam source and the second laser beam source being adjacent to the first laser beam source in the direction.

6. The method for manufacturing the liquid supply member according to claim 1, wherein the plurality of laser beam sources include at least a first laser beam source provided at a position at which the first laser beam source can irradiate the first portion with laser beams, and a laser beam source that is provided at a periphery of the first laser beam source and irradiates the first portion with laser beams.

7. A method for manufacturing a liquid discharge head including a discharge port that discharges liquid and a liquid supply member that supplies that discharge port with liquid, the method comprising:
 preparing a transparent member being transparent to a laser beam and an absorption member for absorbing a laser beam, at least one of the transparent member and the absorption member having a groove for forming a supply path that supplies the discharge port with liquid;
 bring the transparent member and the absorption member into contact with each other, with the groove inside;
 arrange a plurality of laser beam sources along a longitudinal direction of the groove so that the plurality of laser beam sources and the groove overlap when viewed from a direction intersecting a main surface of the absorbing member; and
 forming the supply path by emitting laser beams simultaneously from the plurality of laser beam sources, via the transparent member, toward a contact portion, which provided in a vicinity of the groove and at which the transparent member and the absorption member are in contact, to weld the transparent member and the absorption member at the contact portion,
 wherein the laser beams are emitted during the forming such that a total irradiation amount per unit area with laser beams for a first portion that are included in the contact portion and located in a vicinity of an end in the longitudinal direction of the groove is larger than a total irradiation amount per unit are with laser beams of a second portion other than the first portion of the contact portion, and
 wherein the groove and the contact are entirely irradiated with laser beams.

8. The method for manufacturing the liquid supply member according to claim 1, wherein
 the supply path is formed at a portion of the absorption member corresponding to the end in the longitudinal direction of the groove, and
 the supply path communicates with the groove, and extends in a direction intersecting with the longitudinal direction of the groove.

9. The method for manufacturing the liquid supply member according to claim 7, wherein
 the supply path is formed at a portion of the absorption member corresponding to the end in the longitudinal direction of the groove, and
 the supply path communicates with the groove, and extends in a direction intersecting with the longitudinal direction of the groove.

10. The method for manufacturing the liquid supply member according to claim 1, wherein a laser beam aperture of the plurality of laser beam sources is larger diameter than a width of the groove.

* * * * *